__United States Patent Office__

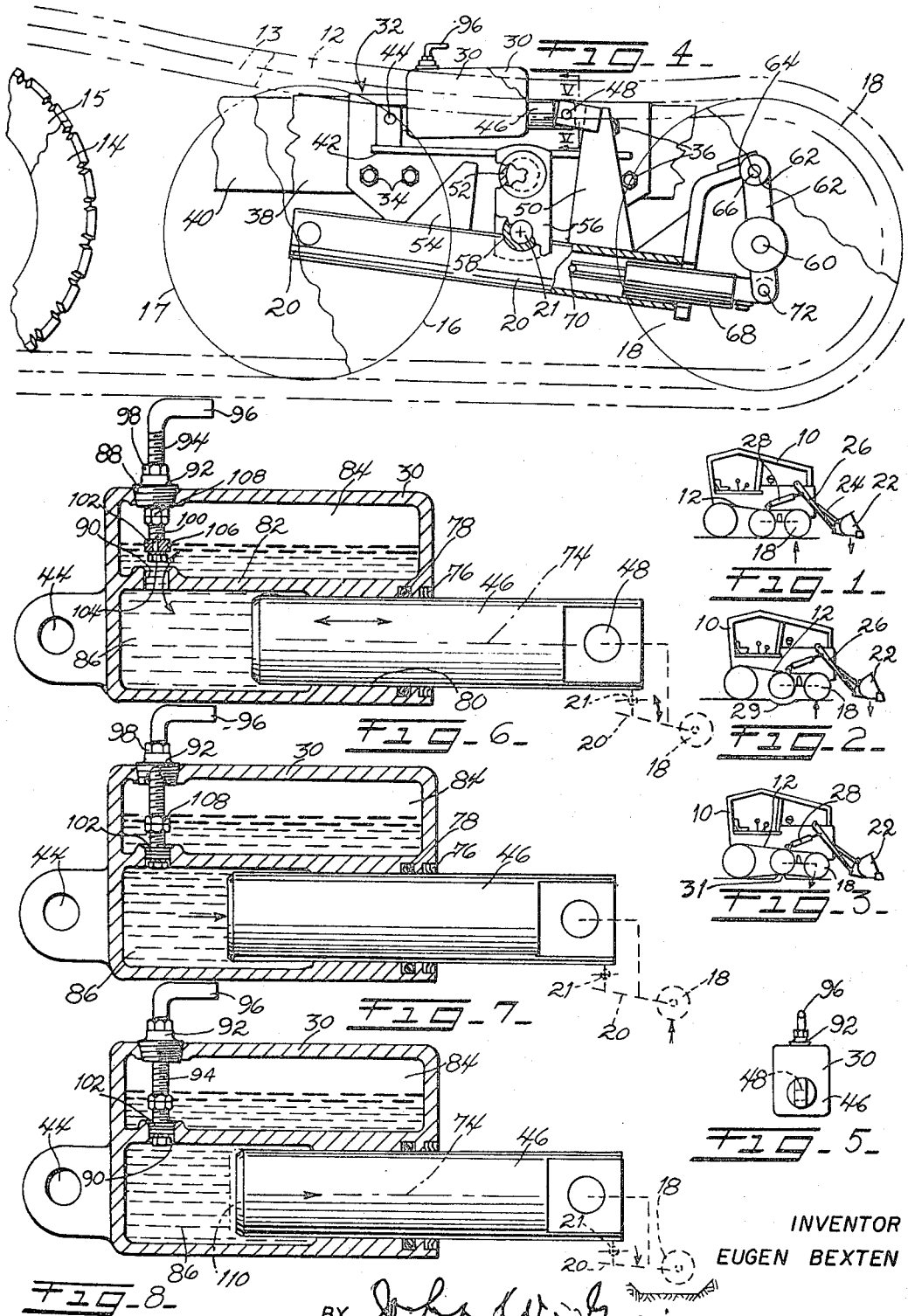

3,452,842
Patented July 1, 1969

3,452,842
CONTROL DEVICE FOR SUSPENSION SYSTEM
Eugen Bexten, Hamilton, Ontario, Canada, assignor to International Harvester Company, a corporation of Delaware
Original application Jan. 26, 1965, Ser. No. 428,062, now Patent No. 3,375,944, dated Apr. 2, 1968. Divided and this application Aug. 2, 1967, Ser. No. 703,195
Int. Cl. F16d 57/00
U.S. Cl. 188—94                    5 Claims

ABSTRACT OF THE DISCLOSURE

An interposed control device for relatively oscillatable suspension members, comprising an hydraulic plunger and cylinder, including a generally horizontal, common wall dividing the device into reservoir and plunger chambers disposed one above the other in that order, means of fluid intercommunication in the device between the chambers so as to contact one end only of the plunger in the cylinder, and valve means in the fluid means for preventing fluid intercommunication whereby the members are hydraulically locked against collapsing together and yet the plunger, through appropriate movement of recession, accommodates to provide unresisted separation of the members by drawing a void in the cylinder.

---

This application is a division of Bexten parent application Ser. No. 428,062, filed Jan. 26, 1965, now Patent No. 3,375,944, which parent patent is related to Bexten Patents Nos. 3,343,889 and 3,275,386. The description of the wheel suspensions in those three patents and other common matter disclosed therein are incorporated in entirety herein by reference.

The present invention relates to a controlled suspension system for bucket carrying vehicles, e.g., a front end loader. It more particularly relates to a ride control device for the vehicle, selectively affording a yieldable front suspension providing riding comfort when the bucket is not in use, and affording a single acting or one-way rigid front suspension during and incident to a loading operation.

Vehicles in general, and especially track type vehicles, are required to operate for entirely different purposes and under contrasting circumstances at different times. In a vehicle traveling at high speed on relatively smooth terrain, a yieldable suspension is desirable for comfort in riding whereas, in the same vehicle during slow operation on rough terrain, rigidity is required and yieldability of the suspension is not only unnecessary but undesirable. Yieldability is especially undesirable in the referred to front end loader vehicles during loading operations, or while engaged in earthmoving or scraping.

Loaders and similar vehicles hitherto have had the difficulty of possessing a suitably comfortable suspension which is too soft for loading work, or have had the difficulty of possessing a suspension solid enough to load, move, and scrape satisfactorily but being otherwise too rough.

My invention materially reduces or largely eliminates the foregoing difficulties as will now be explained. Also, features, objects, and advantages will be particularly pointed out or become apparent when, for a better understanding of the invention, reference is made to the following written description, taken in conjunction with the accompanying drawing which shows a preferred embodiment thereof and in which:

FIGURES 1, 2 and 3 are small scale, side elevational showings of a vehicle, the suspensions of which embody the present invention and which are shown in a sequence of views encountering differing formations in the terrain;

FIGURE 4 is a fragmentary view showing the front suspension portion of the vehicle of FIGURE 1, but to enlarged scale;

FIGURE 5 is a front elevational view of an hydraulic control device as viewed in the direction of the arrows V—V of FIGURE 4; and FIGURES 6, 7 and 8 are longitudinal, side elevational views of the control device showing it in cross section to illustrate the internal reaction to a sequence of operating conditions.

More particularly in the drawing, a track laying vehicle 10 known as a skidder is shown equipped for use as a front end loader. The vehicle 10 has a three wheel suspension supporting an endless track assembly 12 at the right side, and a symmetrically identical three wheel suspension supporting a like endless track assembly 13 at the left side.

The wheels are in tandem in each suspension, and include right and left rear drive wheels carrying pneumatic tires 14 and 15 provided with transverse, rubber drive lugs in the tread. The right and left middle or center wheels 16 and 17 are smooth treaded and are of a predetermined small diameter. The right and left frontmost wheels are similarly smooth treaded and are of the predetermined small diameter referred to, each being indicated by the same reference numeral 18.

A pair of substantially identical, longitudinally extending beams, both indicated at 20, is included with one beam in the front portion of each suspension of the vehicle. The beam 20 on the right side carries a front wheel 18 at the front end and the center wheel 16 at the rearwardly extending end. The beam 20 in the suspension on the left side carries a front wheel 18 at the front end and the center wheel 17 at the rearwardly extending end. Each beam 20 is connected at the midportion to a fixed trunnion pin, one of which is shown at 21, so as to allow the associated front and center wheels carried thereby to simultaneously oscillate in opposite directions in a vertical plane.

A front end loader bucket 22 is connected to, and is controlled by, control links 24. The bucket is also connected to a pair of forwardly projecting booms, one of which is shown at 26 and which are located on opposite sides of the front end of the vehicle 10. A pair of hydraulic cylinders, one of which is shown at 28, is disposed one on each side of the vehicle and each is connected to an intermediate point on the boom 26 at that side for supporting the loader bucket 22 in the cantilever fashion indicated in FIGURE 1. It is desirable in the vehicle 10 to react the bucket load, indicated by the downwardly directed arrow, into the ground as close as possible to the loader bucket. Hence, the optimum ground support point would be in line with the upwardly directed arrow into the front wheels 18. This fixed wheel location should not be disturbed in case the middle wheels encounter a rut 29 in the terrain as illustrated in FIGURE 2. Therefore, the beam in that case cannot allow upward oscillation of the front wheels, known as jounce, and the bucket load is reacted or concentrated at the frontmost points with optimum stability.

In FIGURE 3, engagement between the middle wheels and a hump 31 encountered in the terrain creates a temporarily unstable condition because the optimum ground reaction point is momentarily lost when the front wheels lose ground contact. Hence, the beams 20 must be comparatively free to oscillate the front wheels 18 immediately groundwardly to reestablish the foremost contact and resume reacting the bucket load into the ground at the point nearest the bucket.

In FIGURE 4, two identical hydraulic control devices 30 are employed, one in each front suspension to provide the control desiderata just described. More particularly, each device 30 is included in a trunnion assembly, one of which is shown at 32 and which are secured by bolts 34 and 36 to respective laterally spaced longitudinally extending, frame side rails 38 and 40 which support the vehicle 10 at opposite sides. A fore and aft extending horizontal plate 42 in the assembly supports a fixed pair of upstanding brackets, and a pivot pin 44 carried by the brackets forms a pivotal connection to the fixed end of the device 30.

The free end of the device 30 comprised a forwardly extending plunger or ram 46 which is connected by a pivot pin 48 to a pair of brackets carried by a tall stop plate 50. The tall plate 50 is rigidly secured in an upstanding position on the beam 20, and oscillates therewith into engagement with a tubular crosspiece 52 fixed in the trunnion assembly so as to limit jounce of the adjacent front wheel 18.

A short stop plate 54 disposed on the opposite side of the fixed trunnion pin 21 from the tall plate 50, is rigid with the beam 20 to limit rebound movement of the front wheel 18 and likewise to limit jounce of the middle wheel. A vertically disposed outside plate 56 in the assembly bridges between and rigidly interconnects the crosspiece 52 and the fixed trunnion pin 21 at their outer end. The pin 21 rotatably supports a trunnion sleeve 58 which is fixed to the beam 20 at the upper midportion and which is transverse to, and establishes a fixed transverse axis of oscillation for, the beam.

Each of the front wheels 18 has a wheel spindle 60 carried by a wheel supporting, suspension arm 62, for fore and aft shift relative to the vehicle so as to adjust tension in the respective track chains 12 and 13. A fixed upstanding arm on the front of each beam 20 carries a pair of spaced apart bearings 64 which are connected by a fixed pivot pin 66 to the fixed upper end of the suspension arm 62. A cylinder 68 which is charged with grease or hydraulic fluid is housed in the beam so as to connect a fixed pivot 70 in the beam 20, which is hollow, and a pivot 72 carried by the freely swinging lower end of the suspension arm 62. The cylinder 68 is extensibly or foreshortenably adjusted by adding or removing the grease or fluid therein, and causes the arm 62 to provide the right load to keep the track chain tight.

In FIGURES 5 and 6, the body of each control device 30 is a generally box shaped casting which reciprocably carries the ram 46 for movement along a longitudinal axis 74. The ram is encircled by a wiper ring 76 and by an O-ring seal 78 which are received in separate grooves within the front end of a cylindrical bore 80 in the lower half of the device 30. A horizontal division wall 82 in the casting is common to an upper reservoir chamber 84, which is usually about half full of hydraulic fluid, and a ram chamber 86 in which the ram 46 works and which is occupied in part by the ram and the balance by hydraulic fluid.

A fill hole 88 in the top of the body of the device 30 communicates with the reservoir chamber 84 and is vertically aligned with a valve controlled port 90 in the common wall 82, the interior surface of the port 90 being a machine finished bore. In the valve open position, the port 90 allows free ingress and egress of reservoir fluid in the direction of the double headed arcuate arrow as the size of the ram chamber 86 is being changed when the ram 46 and the front wheel 18 freely oscillate.

A plug 92 is threaded into the fill hole 88 and has a vertical aperture therethrough which threadedly receives a valve stem 94. A bent handle 96 at the upper end of the stem 94 allows the rider to turn the stem for valve adjustment, and he locks the stem in selected vertical positions by means of an upper nut 98 threaded on the stem and engageable with the outside of the plug 92. At the lower end, the valve stem 94 is of reduced cross section, forming a swivel connection 100 with a disk shaped valve 102 and supporting a nut 104 at the bottom which retains the valve 102 in place. The valve 102 has a horizontal annular groove in the middle, receiving an O-ring 106 which seals the valve in the port 90 in the valve closed position with a two-way effect preventing fluid intercommunication both ways in the device 30.

A pair of jamb nuts 108 threaded on the stem 94 engages the inner end of the plug 90 in the valve open position to act as a stop, thus informing the rider that he has moved the valve 102 to its fully withdrawn position relative to the port 90 (FIGURE 6).

In FIGURE 7, the valve 102 is in the lowermost or valve closed position, locked therein by means of the lock nut 98. The chamber 86, therefore, provides an hydraulic lock against the ram 46. The adjacent front wheel 18 cannot move upwardly relative to the vehicle when the wheel strikes a bump as illustrated by the upwardly directed arrow in FIGURE 7. The front wheel 18 is similarly rigidly located against upward movement in both conditions illustrated in FIGURE 1 and in FIGURE 2 foregoing.

In FIGURE 8, the opposite condition creates a different effect, namely, the condition resulting when the vehicle temporarily loses its ground support at the front wheels. Each front wheel 18 could, for example, encounter a rut or it could lose its support due to the condition illustrated in FIGURE 3. In either case, the intensification of load on the middle wheels causes each beam 20 rapidly to oscillate the associated front wheel 18 groundwardly and the ram 46 immediately withdraws outwardly, drawing a vacuum or void 110 in the fluid in the ram chamber 86. Fluid evaporates into the resulting void and the chamber 86 is consequently occupied in part by the ram 46, in part by vapor, and the balance by the fluid. As soon as the terrain permits, the front wheels 18 re-level with respect to the middle wheels, the ram 46 is restored to its initial condition so as to fill the void and to reestablish the hydraulic lock against movement of the ram 46 farther inwardly.

For purposes of working the vehicle with a front end loader, the driver sets each device 30 in the valve closed position illustrated in FIGURES 7 and 8, thus solidly locating the front wheels 18 against deviation due to jounce. On the other hand, part of the riding comfort is retained when it does not interfere with loading and, in accordance with FIGURE 8, stability during a loading operation is actually improved because the present device allows the front wheels 18 to accommodate downwardly whenever the vehicle loses the ground reaction support that the front wheels normally provide at the extreme front end.

When the tractor is not working with the front end loader, high speed ground travel can be resumed. Hence, the driver adjusts the devices 30 into the valve open position illustrated in FIGURE 6, so that no yieldability is sacrificed and the front suspensions provide full riding comfort.

My device makes the present skidder type loader operate with a highly beneficial but unexpected result. No matter what surface variation is encountered on the ground, any tendency toward rearward shift of the nearest or optimum ground support point with reference to the bucket is self defeating. That is to say, the device readily accommodates and moves when the front wheels try to drop, and the shift of the ground reaction therefrom has a cumulative effect. The bucket load has greater leverage on the middle wheels, whose ground pressure intensifies in a geometric ratio and, by exerting reaction torque in the suspension beam, forces the front wheels to seek reestablished ground contact at a substantially accelerated rate.

It will be appreciated that a twofold objective is accomplished by the suspension described, to wit, it cancels the tendency for the front wheels to yield in jounce when supporting the vehicle normally and it substantially overcomes or cancels the tendency, due to inertia, for the front wheels to dangle when they lose their normal ground support.

What is claimed is:
1. In mechanism having a pair of relatively oscillatable members:
   an hydraulic plunger and cylinder device secured at each end to and operatively between the members, and including a generally horizontal, common wall dividing the device into reservoir and plunger chambers disposed one above the other in that order;
   said plunger being reciprocably received at its inner end in the plunger chamber selectively for extensible movement or for acting in compression when the members relatively oscillate toward one another;
   means of fluid intercommunication in said device between the chambers at only the inner end of said plunger; and
   two-way valve means in the fluid means having a valve closed position for preventing fluid intercommunication two ways therethrough, and having a valve open position, said two-way valve means in the valve closed position causing the fluid to be hydraulically compressed by the plunger when acting in the compression direction, said plunger drawing a void in the other direction from the fluid.

2. In mechanism having a pair of relatively oscillatable members:
   an hydraulic plunger and cylinder device pivotally secured at each end to and operatively between the members, and including a generally horizontal, common wall dividing the device into reservoir and plunger chambers disposed one above the other in that order;
   said plunger being reciprocably received in the plunger chamber selectively for extensible movement or for acting in compression when the members relatively oscillate toward one another;
   a fill plug and a fill hole at the top of the reservoir chamber in said plunger and cylinder device;
   a port in the common wall in axial registration with said plug and fill hole, said port constituting the sole means of communication between the chambers; and
   two-way valve means for preventing fluid intercommunication two ways, comprising a valve in the port operable between open valve and closed valve positions, and a valve operating stem connected to the valve and projecting through the reservoir chamber, through an aperture in the fill plug, and thence to an external point for remote operation of the valve from that point;
   said two-way valve means in closed valve position of said valve thereof causing the fluid to be hydraulically compressed by the plunger when acting in the compression direction, said plunger drawing a void in the other direction from the fluid.

3. In mechanism having a pair of relatively oscillatable members:
   an hydraulic plunger and cylinder device pivotally secured at each end to and operatively between the members, and including a generally horizontal common wall dividing the device into reservoir and plunger chambers disposed one above the other in that order;
   said plunger being reciprocally received in the plunger chamber selectively for extensible movement or for acting in compression when the members relatively oscillate toward one another;
   a fill plug and a fill hole in the reservoir chamber of said plunger and cylinder device;
   a port in the common wall in axial registration with said plug and fill hole, said port constituting the sole means of communication between the chambers; and
   two-way valve means for preventing fluid intercommunication two ways, comprising a valve in the port, and a valve operating stem connected to the valve and projecting through the reservoir chamber, through an aperture in the fill plug, and thence to an external point for remote operation of the valve from that point;
   said stem having a retracted position in which the valve is in the plane of the port blocking passage of the fluid, and an extended position, said two-way valve means when the stem is in the retracted position causing the fluid to be hydraulically compressed by the plunger acting in the compression direction, said plunger drawing a void in the other direction from the fluid;
   stop means on the valve stem on the inner side of, and engaging, the fill plug when the stem is in the extended position, thereby insuring full opening of the port; and
   lock means on the valve stem on the outer side of the plug for locking the stem to the plug in the respective retracted and extended positions of said stem.

4. In mechanism having a pair of relatively oscillatable members:
   a hydraulic plunger and cylinder device secured at each end to and operatively between the members, and including a generally horizontal, common wall dividing the device into reservoir and plunger chambers disposed one above the other in that order, said plunger being reciprocably received in the plunger chamber selectively for extensible movement or for acting in compression when the members relatively oscillate with one another;
   a fill plug and a fill hole at the top of the reservoir chamber in said plunger and cylinder device;
   a fluid-communication port in the common wall in axial registry with the fill plug and hole; and
   two-way valve means for preventing fluid intercommunication two ways, comprising a valve in the port operable between open valve and closed valve positions, a valve operating stem connected to the valve and projecting through the reservoir chamber, through an aperture in the fill plug, and thence to an external point for remote operation of the valve from that point;
   said two-way valve means in closed valve position of said valve thereof causing the fluid to be hydraulically compressed by the plunger when acting in the compression direction, said plunger drawing a void in the other direction from the fluid;
   said valve of the two-way valve means comprising a disc in said port swivelled to the stem at an inner point thereon and carrying an annular seal about the disc for sealing the disc within the port in said closed valve position; and
   a nut on the valve operating stem for suspending the disc therefrom in freely swivelling relation.

5. In mechanism having a pair of relatively oscillatable members:
   a hydraulic plunger and cylinder device connected between the members and including a generally horizontal common wall dividing the device into reservoir and plunger chambers disposed above the other in that order;
   said plunger being reciprocably received in the plunger chamber and acting in compression when the members relatively oscillate toward one another;
   a fill plug and a fill hole in the reservoir chamber of said device;
   means of fluid intercommunication in said device between the chambers, comprising a port in the common wall in axial registration with said plug and fill hole;
   valve means for preventing fluid intercommunication to hydraulically lock the members apart, said valve means comprising a valve in the port;

a valve operating stem connected to the valve and projecting through the reservoir chamber, through an aperture in the fill plug, and thence to an external point for remote operation of the valve from that point, said stem having a retracted position in which the valve is in the plane of the port blocking passage of the fluid, and an extended position;

said valve comprising a disc swivelled to the stem at an inner point thereon and carrying an annular seal about the disc for sealing the disc within the port;

a nut on the valve operating stem for suspending the disc therefrom in freely swivelling relation;

stop means on the valve stem on the inner side of, and engaging, the fill plug when the stem is in the extended position, thereby insuring full opening of the port; and lock means on the valve stem on the outer side of the plug for locking the stem to the plug in the respective retracted and extended positions of said stem.

References Cited

UNITED STATES PATENTS

| | | |
|---|---|---|
| 1,386,196 | 8/1921 | Munn. |
| 2,205,508 | 6/1940 | Williams. |
| 2,282,652 | 5/1942 | Henning _____ 188—94 |
| 2,704,650 | 3/1955 | Rand _____ 251—88 X |
| 2,761,254 | 9/1956 | Jameson _____ 188—94 X |
| 3,107,753 | 10/1963 | Georgette _____ 188—94 |
| 3,281,111 | 10/1966 | Cart _____ 251—88 |

FOREIGN PATENTS 845,769  8/1960  Great Britain.

GEORGE E. A. HALVOSA, *Primary Examiner.*